Jan. 16, 1968    H. RUBE    3,363,851
PROJECTOR

Filed Sept. 23, 1965    4 Sheets-Sheet 1

INVENTOR
HELMUT RUBE
BY
Michael S. Striker
his ATTORNEY

INVENTOR
HELMUT RUBE
BY
Michael J. Striker
his ATTORNEY

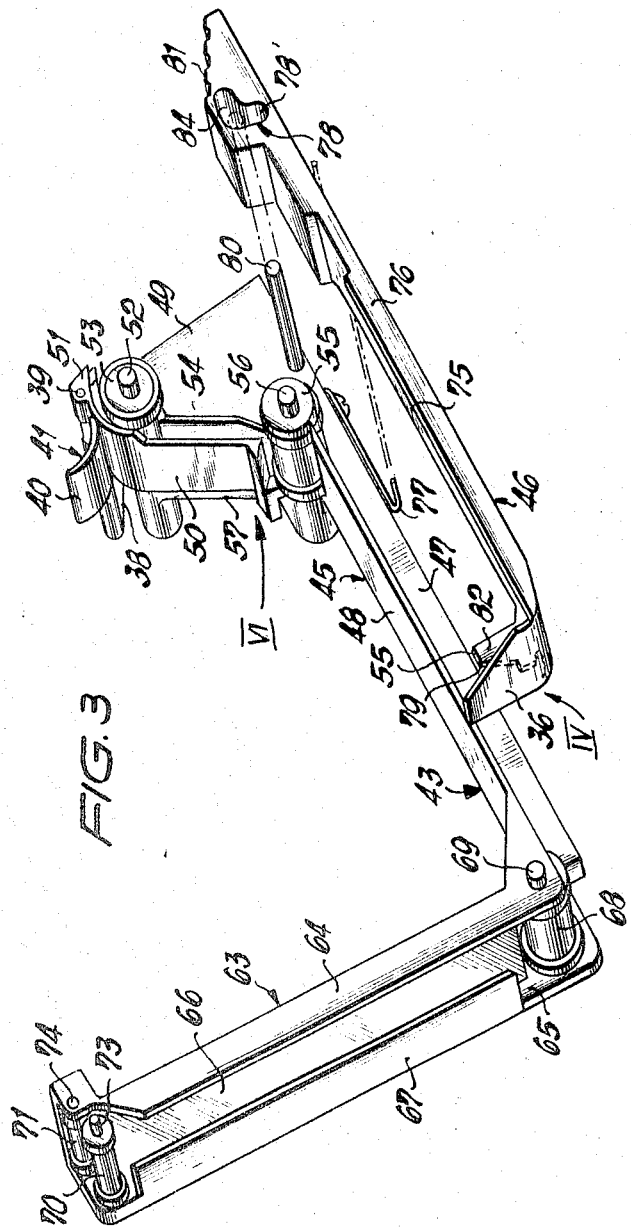

Jan. 16, 1968  H. RUBE  3,363,851
PROJECTOR
Filed Sept. 23, 1965  4 Sheets-Sheet 4
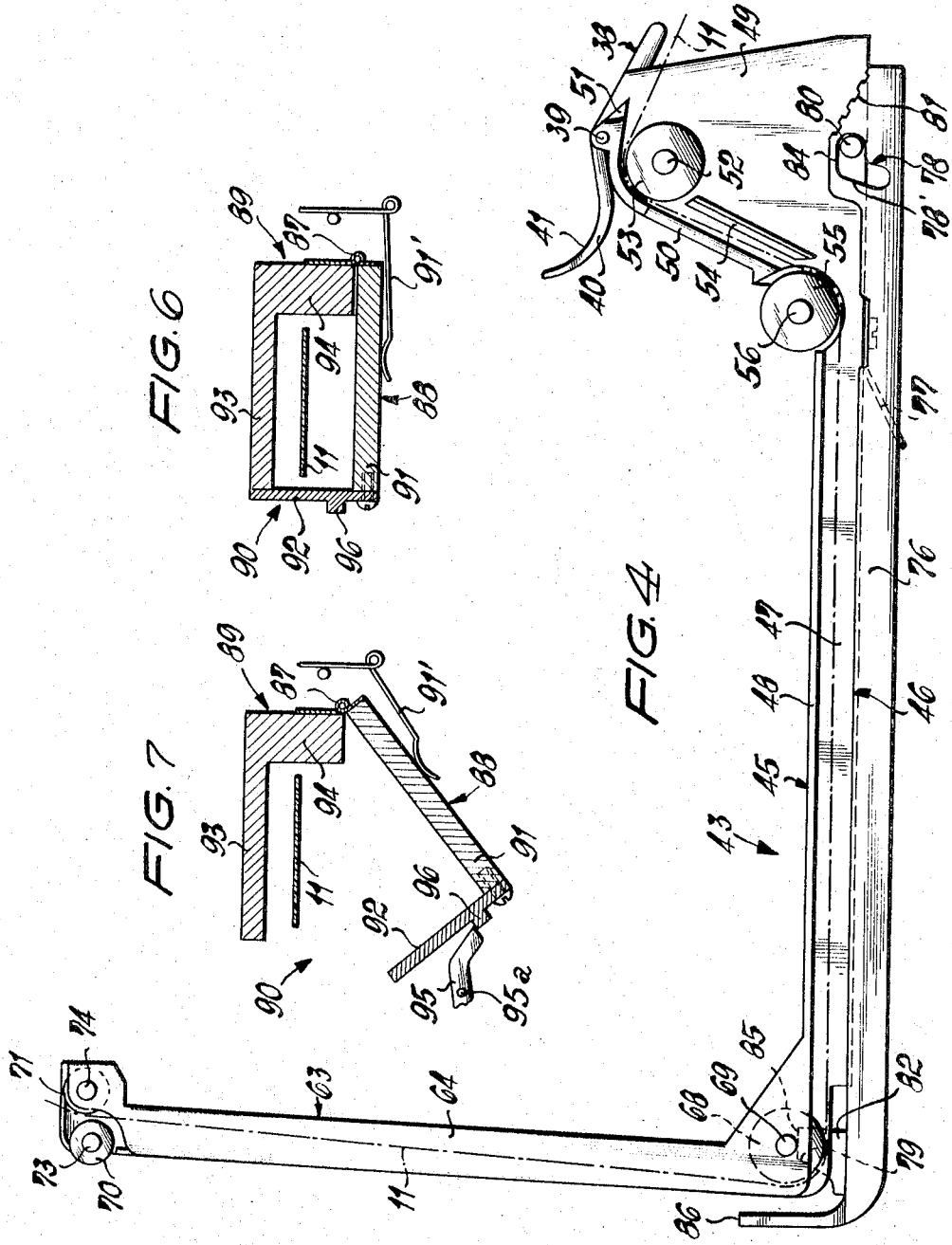
INVENTOR
HELMUT RUBE
BY
Michael J. Striker
his ATTORNEY 3,363,851
PROJECTOR
Helmut Rube, Endersbach, Germany, assignor to Eugen Bauer, G.m.b.H., Stuttgart, Germany
Filed Sept. 23, 1965, Ser. No. 489,657
Claims priority, application Germany, Sept. 29, 1964, B 78,702
21 Claims. (Cl. 242—55.11)

ABSTRACT OF THE DISCLOSURE

A motion pcture projector with a film threading device for advancing and guiding the film between the supply reel and the takeup reel during threading and during projection of images. The threading device comprises one or more feed sprockets which advance the film lengthwise and a guide channel which normally encloses the film from all sides in a region between the sprockets and the takeup reel. A section of the channel is movable with reference to the remainder of the channel and substantially transversely of the film between closed and open positions in which it respectively prevents and affords access to that portion of the film which extends through the channel. The movable section is biased to closed position.

The present invention relates to movie projectors in general, and more particularly to improvements in so-called self-threading projectors wherein the leading end of the film is caused to automatically find its way to the core of the takeup reel. Still more particularly, the invention relates to improvements in the construction of self-threading devices for movie projectors.

It is already known to construct the self-threading device of a movie projector in such a way that a part thereof constitutes a fully or partly open guide channel through which the film is advanced by the feed sprockets on its way to the takeup reel. In many heretofore known projectors, the guide channel is removable in its entirety so that the film may be inserted into a sound unit or may be spliced without necessitating removal of the film from the remainer of the self-threading device. A serious drawback of such self-threading devices is that the guide channel may become misplaced and, upon detachment from the projector housing, the channel is quite likely to be deformed or otherwise damaged. It is also known to construct a guide channel in such a way that only a portion thereof is bodily removable from the projector housing; however, such constructions share the drawbacks of the previously described conventional self-threading devices.

Accordingly, it is an important object of the present invention to provide a movie projector with a film threading device, preferably of the self-threading type, which comprises a guide channel for leading the film toward the takeup reel and to construct and assemble the guide channel in such a way that it may be caused to conceal or to expose a desired length of the film in an exceptionally simple, space-saving and time-saving manner.

Another object of the invention is to provide a self-threading device of the just outlined characteristics wherein the guide channel is constructed in such a way that, in order to expose a desired length of film, its parts need not be fully detached from the projector housing and/or from each other so that the danger of misplacing, deforming, otherwise damaging or soiling the movable part of the channel is eliminated despite the fact that the channel can expose the film sufficiently to provide for convenient access to the fingers of an operator's hand.

A further object of the invention is to provide a multi-section guide channel for film in a movie projector with a self-threading device and to assemble the sections of the guide channel in such a way that at least one thereof may carry one or more additional components of the self-threading device, such as one or more guide rollers, guide rails, guide strips, blocking means for holding a lop former in operative position during automatic threading of the film, and others.

An additional object of the invention is to provide a multi-section guide channel of the above outlined characteristics wherein the movable section can be automatically retained in either of its two end positions and wherein little effort is required to displace the movable section from either of such end positions.

A concomitant object of the instant invention is to provide a guide channel wherein the movable section can expose a length of film which suffices to allow for convenient splicing without necessitating removal of the film from the remainder of the self-threading device.

Still another object of the present invention is to provide a self-threading device which embodies a guide channel of the above described type and which can be used in movie projectors with or without sound.

Briefly stated, one feature of my present invention resides in the provision of a movie projector which comprises a film supply reel, a takeup reel, a housing supporting the two reels and including a frame plate or an analogous support, and a preferably automatic film threading device mounted on the support and defining an elongated path along which the film is guided between the two reels. In accordance with my invention, the film threading device comprises a feed sprocket for advancing the film lengthwise and a guide channel through which the film is advanced between the feed sprocket and the takeup reel. The channel comprises a plurality of sections which are permanently mounted on the support and define between themselves an elongated passage for a portion of the film and at least one of the sections is movable with reference to the remainder of the channel in directions substantially transversely of the film between an open and a closed position in which it respectively affords and prevents access to that portion of the film which extends through the passage in the channel.

The movable section may be hingedly attached to the remainder of the guide channel and/or directly to the support. Alternatively, the movable section may be arranged to reciprocate lengthwise and to simultaneously move toward or away from the film. The fixed part or section of the guide channel may be provided with control cam means and the movable section may be provided with follower means, or vice versa, and the control cam means cooperate with the follower means in such a way that the movable section is compelled to move toward or away from the film in response to lengthwise displacement to the left or to the right.

In accordance with a further feature of the invention, each section may resemble a profiled rail of L-shaped cross-sectional outline, and the fixed section may be provided with a hollow tubular leg so that, in its entirety, the fixed section resembles an L-shaped or V-shaped body.

The novel features which are considered as characteristic of the invention are set forth in particular in the appended claims. The improved projector itself, however, both as to its construction and its mode of operation, together with additional features and advantages thereof, will be best understood upon perusal of the following detailed description of certain specific embodiments with reference to the accompanying drawings, in which:

FIG. 3 is an exploded perspective view of a portion of the self-threading device with the movable section of the guide channel shown in open position;

FIG. 4 is a side elevational view of the guide channel with the movable section in open position;

FIG. 6 is a transverse vertical section through an intermediate portion of a modified guide channel whose movable section is shown in closed position; and FIG. 7 is a similar view which illustrates the channel of FIG. 6 with the movable section in open position.

Figure 1:
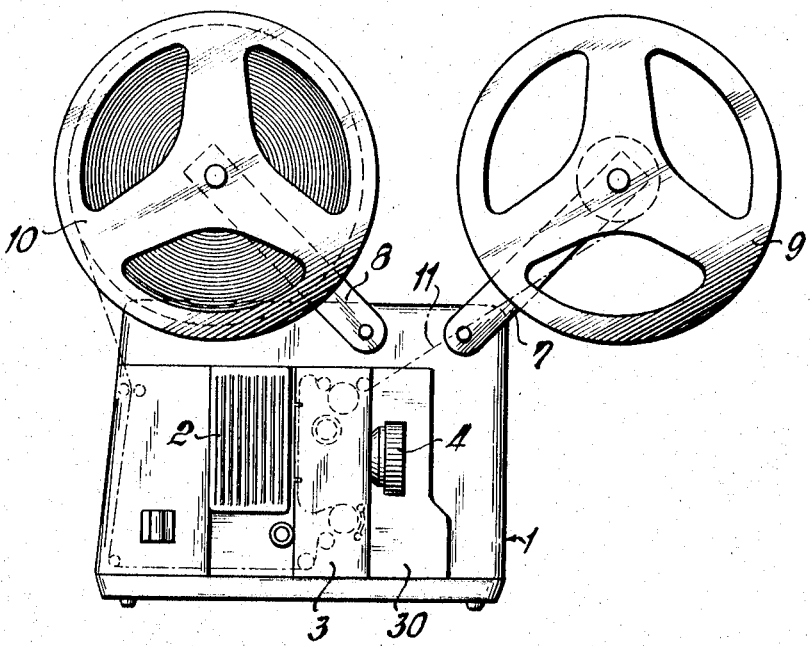
FIG. 1 is a somewhat schematic side elevational view of a projector which embodies one form of the present invention.
Figure 2:
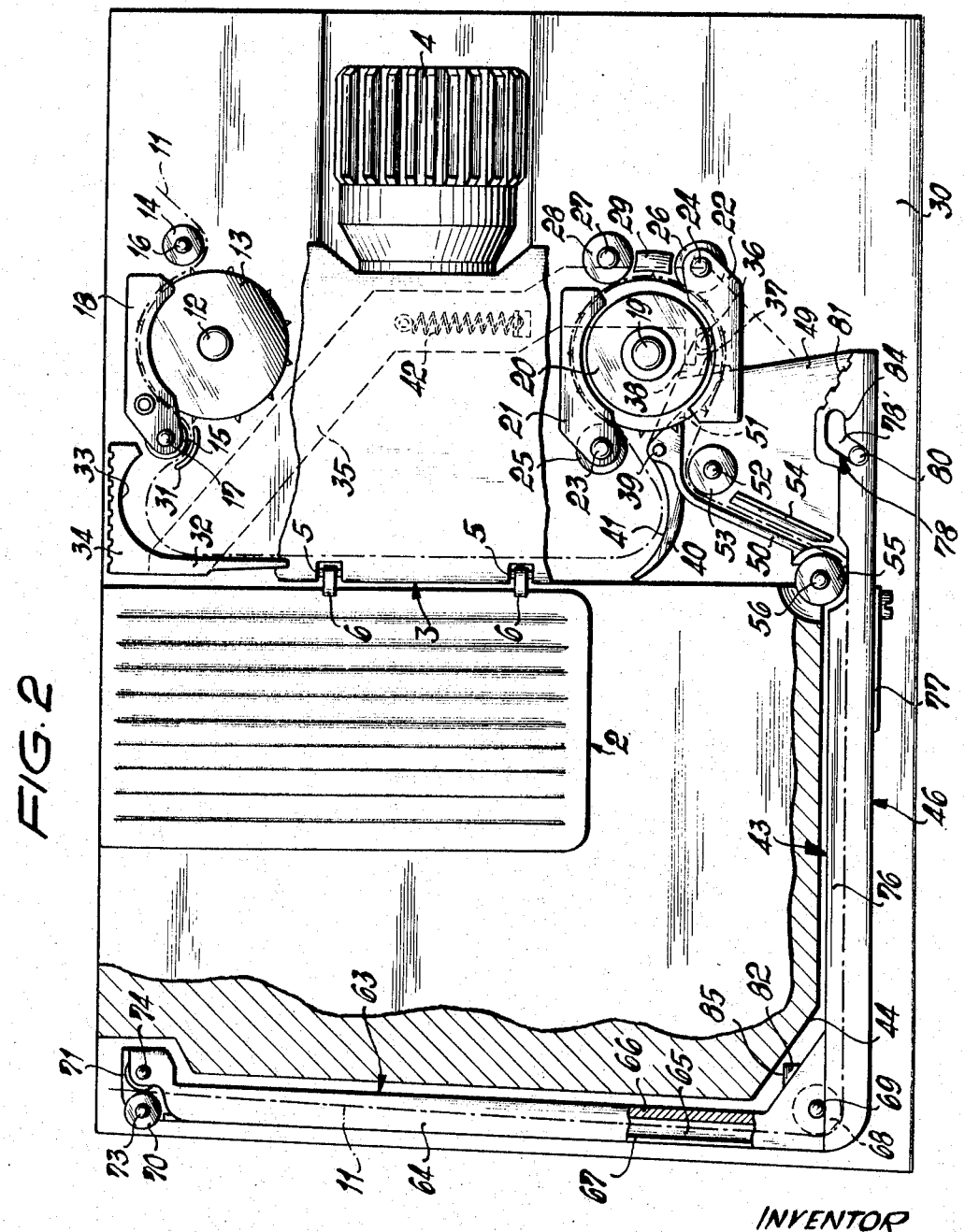
FIG. 2 is a greatly enlarged side elevational view of a self-threading device which forms part of the projector shown in FIG. 1, certain parts of the projector being broken away for the sake of clarity.

Referring to the drawings, and first to FIGS. 1 and 2, there is shown a movie projector comprising a housing 1 which includes a lamp supporting portion or cabinet 2. A film gate 3 is hingedly mounted in front of the lamp cabinet 2 and carries a projection lens 4. The means for swingably attaching the film gate 3 to the housing 1 comprises a vertical pintle 5 which extends in parallelism with the adjoining portion of the film 11, and eyes 6 which form part of the lamp cabinet 2. The upper portion of the housing 1 supports two folding reel arms 7 and 8 which respectively carry a film supply reel or spool 9 and a film takeup reel or spool 10. In forward operation, the film 11 is being paid out by the reel 9 and is being taken up by the driven reel 10. When the projector is operated in reverse, the film travels from the reel 10 and is taken up by the driven reel 9.

FIG. 2 shows that the housing 1 supports a self-threading device including a driven horizontal shaft 12 which is provided at a level above the projection lens 4 and drives an upper feed sprocket 13 whose teeth extend into customary perforations of the film 11. The feed sprocket 13 cooperates with a pair of guide rollers 14 and 15 which are respectively mounted on horizontal shafts 16 and 17. A spring-biased sprocket guide 18 is rockable on the shaft 17 and extends from the guide roller 15 toward the guide roller 14 so as to overlie the upper portion of the feed sprocket 13. The underside of the sprocket guide 18 constitutes a concave guide face which engages the film 11 and maintains the adjoining teeth of the feed sprocket 13 in the respective perforations.

The self-threading device of the projector further comprises a lower feed sprocket 20 which is located at a level below the projection lens 4 and is mounted on a horizontal shaft 19. This lower feed sprocket 20 cooperates with an upper spring-biased sprocket guide 21 which is rockable on the shaft 23 of a guide roller 25, and with a lower spring-biased sprocket guide 22 which is rockable on the shaft 24 of a further guide roller 26. An additional guide roller 28 is mounted on a horizontal shaft 27 and is located in the space between the free end of the upper sprocket guide 21 and the guide roller 26. The guide roller 28 is followed by a fixed arcuate film guide 29 so that the film 11, entering between the guide roller 25 and the adjoining portion of the lower feed sprocket 20, is guided by the parts 21, 28, 29, 26 and 22 in the just given sequence and is compelled to form a loop or eye which surrounds almost the entire lower feed sprocket 20. The parts 12 to 29 are mounted on a frame plate or main support 30 which, in turn, forms part of the projector housing 1. This frame plate 30 is further provided with an integral arcuate projection 31 which constitutes an inner guide for the film 11 and surrounds with requisite clearance the lower part of the guide roller 15 immediately downstream of the upper feed sprocket 13. The projection 31 guides the film 11 toward an arcuate outer guide 32 which constitutes an upper loop former for the film 11. The loop former 32 is provided with a concave underside 33 which resembles a portion of a circle and constitutes a guide face for the adjoining portion of the film 11. The top portion 34 of the loop former 32 is readily accessible and constitutes an actuating member or pushbutton which may be depressed by a finger for the purpose to be described hereinafter.

The loop former 32 is connected with a motion transmitting rail 35 which is located behind the frame plate 30 and is reciprocable up and down in response to similar movements of the pushbutton 34. The lower part of the rail 35 is coupled to a lower loop former 38 by means of a pin-and-slot connection 36, 37 best shown in FIG. 5. The lower loop former 38 is located ahead (upstream) of the lower feed sprocket 20 and loops the film 11 just before the latter reaches the guide roller 25. The loop former 38 is rockable on a horizontal shaft 39 and resembles a two-armed lever whose arm 40 is shaped as a sickle and is provided with a concave guide face 41 which causes the film 11 to form a loop. A resilient element in the form of a helical spring 42 (see FIG. 2) operates between the rail 35 and the frame plate 30 and tends to maintain the rail 35 in the upper end position in which the guide faces 33, 41 of the loop formers 32, 38 are spaced from the adjoining portions of the film 11. Such inoperative positions of the loop formers 32, 38 are shown in FIG. 2, and these loop formers assume their respective inoperative positions when the projector is in actual use.

In accordance with an important feature of the present invention, the self-threading device comprises a substantially L-shaped guide channel 43 serving to guide that length of the film 11 which extends from the lower feed sprocket 20 and on toward the takeup reel 10. The guide channel 43 is best shown in FIGS. 2, 3 and 4, and is accommodated in a complementary recess or groove 44 provided in the frame plate 30. This guide channel comprises two main sections or halves 45, 46 each having a substantially L-shaped cross-sectional outline. When the sections 45 and 46 are closely adjacent to each other, they form a tubular conductor and define between themselves a passage of substantially rectangular cross-sectional outline which accommodates the film 11 with requisite clearance. The sections 45, 46 are permanently mounted on the frame plate 30 but one thereof is movable toward and away from the other so as to allow for rapid and convenient insertion or withdrawal of the film. In the illustrated embodiment, the section 45 is L-shaped and is rigid with the frame plate 30 but the section 46 resembles an elongated L-bar and is movable in directions substantially at right angles to and (transversely) of the film plane.

The walls or flanges 47 and 48 of the lower leg of the fixed section 45 respectively constitute the rear wall and the top wall of the lower part of the channel 43. This fixed section 45 also comprises a plate-like enlargement or hump 49 which is adjacent to the lower feed sprocket 20 and carries the aforedescribed parts 38–40, see particularly FIGS. 3 and 4. The enlargement 49 also carries a guide rail 50 for the film 11, and the guide rail 50 is provided with a stripping finger 51 which extends into a circumferential groove (not shown) of the lower feed sprocket 20 to separate the film therefrom and to direct it toward the passage defined by the guide channel 43. The guide rail 50 is adjacent to the upper side of the film 11 and extends downwardly toward a guide roller 55 mounted on a horizontal shaft 56 carried by a one-armed lever 57 (see FIG. 5) immediately adjacent to the receiving end of the fixed section 45, see particularly FIG. 4. The underside of that portion of the film 11 which advances along the guide rail 50 is guided by a fixed guide rail or guide strip 54 which is rigid with the enlargement 49. The parts 50 and 54 define between themselves a downwardly inclined straight groove through which the film 11 advances toward and is then deflected by the lower part of the guide roller 55. An additional guide roller 53 is mounted on a shaft 52 which is carried by the enlargement 49 and serves to deflect the film into the aforementioned groove between the guide channel 50 and guide strip 54.

Figure 5:
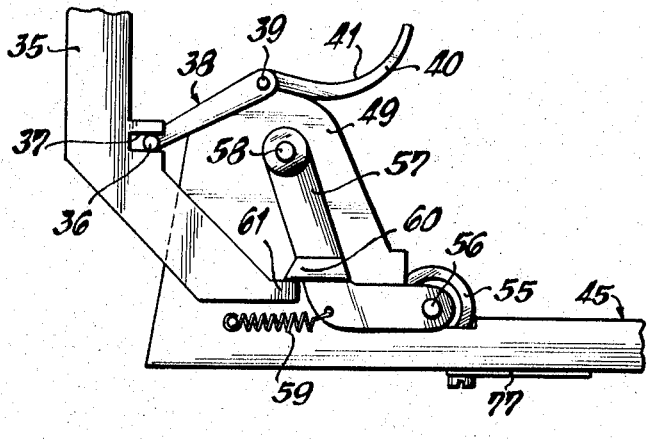
FIG. 5 is a rear elevational view of a portion of the structure shown in FIG. 2, substantially as seen in the direction of the arrow VI in FIG. 3.

The one-armed lever 57 is mounted behind the enlargement 49 (see FIG. 5) and constitutes a blocking device for the motion transmitting rail 35. The lever 57 is rockable on a horizontal pivot 58 which is secured to the frame plate 30 or to the enlargement 49 and is rockable by a helical spring 59 which tends to rotate it in a clockwise direction, as viewed in FIG. 5, i.e., in a counterclockwise direction as the parts appear in FIG. 2. When holding the motion transmitting rail 35 in the lower end position (namely, against the bias of the return spring 42), the lever 57 maintains the loop formers 32 and 38 in their operative positions such as are assumed by the loop formers during automatic threading of the film 11. The disengagement of the lever 57 from the rail 35 takes place automatically and is effected by the film 11 when the latter reaches and is attached or attaches itself to the core of the takeup reel 10. As shown in FIG. 5, the lever 57 is provided with a blocking projection or nose 60 which can engage a complementary projection or nose 61 at the lower end of the motion transmitting rail 35. When the film 11 reaches the core of the reel 10 and is drawn tight in response to rotation of this reel, it lifts the guide roller 55 whose shaft 56 is mounted at the free lower end of the lever 57 whereby the lever 57 rocks against the bias of the spring 59 and moves its nose 60 away from the nose 61 of the rail 35 so that the latter can follow the bias of the spring 42 and returns to its upper end position.

The upwardly extending portion of the recess or groove 44 in the frame plate 30 accommodates the upwardly extending leg 63 of the fixed channel section 45. This leg 63 comprises a front side wall 64, a rear side wall 65, a bottom wall 66 which extends all the way between the side walls 64, 65, and a cover or lid 67 which is rigid with the rear side wall 65 but extends only about halfway toward the front side wall 64 so that there remains a gap (see FIG. 3) through which the film 11 may be introduced into the interior of the leg 63. If desired, the leg 63 may be manufactured as a separate component and may be detachably or permanently affixed to the top wall 48 of the fixed section 45. The lower part of the leg 63 accommodates a deflecting roller 68 which is mounted on a horizontal shaft 69 journalled in the side walls 64 and 65. The upper end of the leg 63 receives two additional guide rollers 70, 71 which are respectively mounted on horizontal shafts 73, 74. The shaft 74 is mounted in the side walls 64, 65 but the shaft 73 is mounted solely in the side wall 65, see FIG. 3.

The movable section 46 comprises a bottom wall 75 which is movable toward and away from the top wall 48 of the fixed section 45, and a front wall 76 which is movable with the bottom wall 75. A resilient element in the form of a leaf spring 77 is mounted at the underside of the rear side wall 47 of the fixed section 45 and tends to bias the movable section 46 to the closed position of FIG. 2. As shown in FIG. 3, a part of the leaf spring 77 is bent forwardly so that it extends below the bottom wall 75 of the movable section 46. In other words, the spring 77 constitutes a means for normally biasing the movable section 46 to its closed position in which the guide channel 43 is closed. The means for moving the section 46 against the bias of the leaf spring 77 and to the open position shown in FIGS. 3 and 4 comprises two control cams 78, 79, two followers 80, 69 and a manually operable actuating member or pushbutton 81. The control cam 78 is formed with a slot having a downwardly extending portion 78′ which is inclined with reference to the longitudinal extension of the section 46 and a substantially horizontal portion 84 which is parallel with the longitudinal extension of the section 46. The control cam 79 is provided on an upwardly extending plate-like lug 82 at the forward end of the movable section 46 and comprises a horizontal portion 85. The follower 80 is a horizontal pin or stud which is rigid with the fixed section 45 or with the frame plate 30 and extends into the slot of the control cam 78. The control cam 79 cooperates with the shaft 69 of the deflecting roller 68, i.e., the shaft 69 performs a dual function by supporting the roller 68 and by also serving as a follower which tracks the face of the cam 79 and thereby causes the section 46 to move downwardly and away from the fixed section 45 when the operator depresses the pushbutton 81 which constitutes the rear end portion of the section 46 and is located behind the control cam 78. The slot portion 84 and the cam portion 85 are substantially parallel with the longitudinal direction of that portion of the film 11 which is accommodated in the space between the sections 45, 46 and the portions 84, 85 are respectively engaged by the followers 80, 69 when the section 46 has been moved to its lower end position shown in FIGS. 3 and 4 and should remain for a while in such lower end position against the bias of the leaf spring 77. Thus, the portions 84, 85 constitute a locking means for releasably holding the section 46 in open position against the bias of the leaf spring 77.

The lug 82 of the movable section 46 extends into a slot 83 in the fixed section 45, this slot being provided between the walls 47 and 65, i.e., in the region of the deflecting roller 68.

The front end of the bottom wall 75 of the movable section 46 constitutes an upwardly extending deflecting tongue or lip 86 which deflects the leading end of the film 11 around the roller 68 and into the space between the walls 64–67 of the leg 63.

The heretofore described self-threading device of FIGS. 1 to 5 operates as follows:

It is assumed that the parts are maintained in the positions shown in FIG. 2. In order to insert a fresh film 11, the operator places a full supply reel 9 onto the folding arm 7 and thereupon depresses the pushbutton 34 so that the motion transmitting rail 35 moves downwardly against the bias of the spring 42 and shifts the loop formers 32, 38 to their operative positions. The nose 60 of the blocking lever 57 automatically engages the nose 61 of the rail 35 under the action of the spring 59 and retains the rail 35 in such lower end position. The motor (not shown) of the projector is started to drive the feed sprockets 13, 20 and the takeup reel 10, and the leading end of the film 11 is inserted into the space between the first guide roller 14 and the upper feed sprocket 13. Such leading end is immediately entrained by the teeth of the sprocket 13 and travels along the concave underside of the sprocket guide 18, around the lower part of the guide roller 15 (in response to deflection by the fixed inner guide 31 of the frame plate 30), along the concave guide face 33 of the depressed upper loop former 32 (which causes the film 11 to form a loop as indicated by a phantom line in the upper part of FIG. 2), through the film gate 3 (behind the projection lens 4 but in front of the lamp which is accommodated in the compartment 2), along the concave guide face 41 of the arm 40 on the lower loop former 38 (which has been rocked to its operative position in response to depression of the pushbutton 34 and in response to resultant retention of the rail 35 by the blocking lever 57), along the lower part of the guide roller 25, and into engagement with the upper part of the revolving lower feed sprocket 20. The feed sprocket 20 causes the leading end of the film 11 to advance along the concave underside of the upper sprocket guide 21, along the guide roller 28 and fixed arcuate guide 29, along the guide roller 26 and along the concave upper side of the sprocket guide 22, whereupon the leading end of the film reaches the stripping finger 51 of the guide rail 50 and is deflected into the groove between the arcuate top portion of the rail 50 and the upper part of the guide roller 53 on the enlargement 49 of the fixed channel section 45. The leading end of the film 11 then continues along the upper side of the guide strip 54 and is deflected by the guide roller 55 to enter the space between the sections 46, 45, i.e. between the walls 47, 48, 75 and 76. As it continues to advance in response to rotation of the feed sprockets 13 and 20, the leading end of the film 11 is deflected by the tongue 86 of the movable section 46 and passes around the deflecting roller 68, through the space defined by the walls 64–67 of the leg 63, between the guide rollers 70, 71 and leaves the channel 43 to advance toward the core of the takeup reel 10. The leading end may be attached to the core of the reel 10 by hand or automatically, depending on the type of the takeup reel. If the attachment of the leading end is automatic, the core of the reel 10 is provided with a customary receiving device or catcher whose construction forms no part of the present invention.

The reel 10 is driven by the motor of the projector at such a speed that it exerts a certain pull on the advancing film 11 whereby the film becomes taut in that zone which extends between the core of the reel 10 and the lower feed sprocket 20, and such tensioning of the film causes the guide roller 55 to move upwardly, as viewed in FIG. 2, so that the blocking lever 57 is rocked against the bias of its spring 59 and the nose 60 moves away from the nose 61 to permit upward movement of the motion transmitting rail 35 under the bias of the spring 42 whereby the pushbutton 34 returns to the position of FIG. 2 and the loop formers 32, 38 automatically reassume their inoperative positions. The projector is now ready for operation and the film 11 continues to travel lengthwise from the supply reel 9, through the self-threading device, and on toward the core of the takeup reel 10.

In order to open the guide channel 43, the operator depresses the readily accessible pushbutton 81 and thereby shifts the section 46 lengthwise in a direction to the left, as viewed in FIG. 2. Such depression of the pushbutton 81 results in downward movement of the section 46 (against the bias of the leaf spring 77) because the movable control cams 78, 79 of the section 46 cooperate with the fixed followers 80, 69 of the section 45. When the pushbutton 81 is fully depressed, the section 46 assumes the open position shown in FIG. 3 or 4 and is releasably held in such open position because the followers 80 and 69 are then located in the horizontal upper portions 84 and 85 of the control cams 78 and 79 respectively. The guide channel 43 is fully open so that the film 11 may be readily withdrawn from the leg 63 and also from the space between the sections 45, 46. Such opening of the channel 43 will become necessary when the person in charge wishes to edit the film 11 by removing a certain length of the film, by removing a damaged portion of the film, by inserting a length which contains a certain scene, a title, credits, or for analogous purposes.

In order to close the channel 43, the person in charge simply engages the lower section 46 and pushes it lengthwise in a direction to the right, as viewed in FIG. 4, until the follower 80 enters the inclined portion 78′ of the slot in the control cam 78 and the follower 69 reaches the inclined portion of the control cam 79. The leaf spring 77 then automatically lifts the section 46 and returns it fully to the closed position of FIG. 2. If desired, the section 46 may be provided with a handle (not shown) to facilitate shifting in a direction to the right, as viewed in FIG. 5. Alternatively, the pushbutton 81 may be shaped as a knob so that it may be grasped in order to move the section 46 to the open position of FIG. 4 or back to the closed position of FIG. 2.

It is clear that the operative connection between the frame plate 30 and the movable section 46 may comprise three or more control cams or an equivalent control structure which can move the section 46 toward and away from the fixed section 45 in response to lengthwise reciprocation of the section 46. Since the section 46 need not be bodily detached from the section 45 and/or from the frame plate 30 when the operator wishes to gain access to that part of the film 11 which extends through the guide channel 43, the section 46 cannot be misplaced and is not likely to undergo undesirable deformation. The control cams 78 and 79 are configured in such a way that, on movement of the section 46 to the open position of FIG. 3 or 4, the operator can readily grasp the film with two fingers.

FIGS. 6 and 7 illustrate a portion of a modified guide channel 90 which may be used as a substitute for the guide channel 43. The guide channel 90 comprises a fixed section 89 of L-shaped cross-sectional outline which is secured to the housing of the projector and a movable section 88 of L-shaped cross-sectional outline which is articulately connected with the fixed section 89 by means of one or more hinges 87. The fixed section 89 defines the top wall 93 and the rear side wall 89 of the guide channel 90, and the movable section 88 defines the bottom wall 91 and the front side wall 92 of the guide channel. A leaf spring 91′ is provided to permanently bias the movable section 88 to the closed position of FIG. 7. When the operator wishes to gain access to the film 11 in the interior of the guide channel 90, the section 88 is pivoted from the closed position of FIG. 6 to the open position of FIG. 7 whereby a stop 96 on the front side wall 92 moves past and is engaged by the free end of a locking or retaining device 95, the latter serving to automatically hold the section 88 in the open position of FIG. 7. In order to bring about return movement of the section 88 to the closed position of FIG. 6, the operator simply rocks the locking device 95 about the pivot 95a so that the leaf spring 91′ is free to move to its unstressed position and autmoatically closes the channel 90.

The operation of the film threading device which embodies the guide channel 90 of FIGS. 6 and 7 is analogous to that of the self-threading device which was described in connection with FIGS. 1 to 5. The upper leg (not shown) of the fixed section 89 may be constructed in the same way as the leg 63 of the section 45.

If desired, the movable section 88 may be hingedly connected directly to the frame plate of the projector housing. An advantage of the construction shown in FIGS. 6 and 7 is that the means for movably mounting the section 88 comprises a minimum of parts and that such mounting means can withstand rough handling without affecting the movability of the section 88.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a projector, a film supply reel; a takeup reel; a support; and a film threading device mounted on said support and defining an elongated path along which the film is guided between said reels; said device comprising a film drive for advancing the film lengthwise and a guide channel which is permanently mounted on said support and through which the film is advanced between said drive and said takeup reel during threading and during projection of images, said channel comprising a plurality of sections one of which is movable with reference to the remainder of said channel substantially transversely of the film between an open and a closed position in which it respectively affords and prevents access to the film.

2. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being movable with reference to said one section substantially transversely of that portion of the film which extends between said sections, said other section being movable between open and closed positions in which it respectively affords and prevents access to said portion of the film.

3. In a movie projector; a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being movable with reference to said one section substantially transversely of that portion of the film which extends between said sections, said other section being movable between open and closed positions in which it respectively affords and prevents access to said portion of the film, said device further comprising means for biasing said other section to closed position.

4. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being movable with reference to said one section substantially transversely of that portion of the film which extends between said sections, said other section being movable between open and closed positions in which it respectively affords and prevents access to said portion of the film, said device further comprising resilient means for biasing said other section to closed position and locking means for releasably holding said other section in open position against the bias of said resilient means.

5. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being movable with reference to said one section substantially transversely of that portion of the film which extends between said sections, said other section being movable between open and closed positions in which it respectively affords and prevents access to said portion of the film, said device further comprising resilient means for permanently biasing said other section to closed position and manually operated actuating means for moving said other section to open position against the bias of said resilient means.

6. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwith and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being movable lengthwise with reference to said one section, said device further comprising manually operated actuating means for moving said other section lengthwise in one direction and control means for moving said other section away from said one section in response to operation of said actuating means so that said other section moves substantially transversely of and exposes that portion of the film which extends between said sections.

7. A structure as set forth in claim 6, wherein said control means comprises a plurality of followers supported by said housing and a plurality of cams provided on said other section and each cooperating with one of said followers to move said other section away from said one section in response to lengthwise movement of said other section.

8. A structure as set forth in claim 7, wherein one of said cams comprises a cam slot receiving the respective follower and having a first portion which is inclined relative to and a second portion which is substantially parallel with the longitudinal extension of said other section so that the other section moves transversely of said film portion when the respective follower is received in said first slot portion.

9. A structure as set forth in claim 7, wherein one of said cams comprises a cam face which is tracked by the respective follower, said cam face having a first portion which is inclined relative to and a second portion which is substantially parallel with the longitudinal extension of said other section so that said other section moves transversely of said film portion when said last named follower tracks the first portion of said cam face.

10. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being hingedly secured to said housing and being movable with reference to said one section substantially transversely of that portion of the film which extends between said sections, said other section being movable between open and closed positions in which it respectively affords and prevents access to said portion of the film.

11. In a movie projector, a housing, a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being hingedly secured to said one section and being movable with refernce to said one section substantially transversely of that portion of the film which extends between said sections, said other section being movable between open and closed positions in which it respectively affords and prevents access to said portion of the film.

12. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline one of said sections being fixedly attached on said housing and the other section being movable with reference to said one section substantially transversely of that portion of the film which extends between said sections, said other section being movable between open and closed positions in which it respectively affords and prevents access to said portion of the film, said device further comprising a loop former movably mounted on said one section upstream of said film drive.

13. A structure as set forth in claim 12, wherein said one section comprises and enlargement adjacent to said film drive and wherein said loop former is movably mounted on said enlargement.

14. In a movie projector, a housing; a film supply reel; a takeup reel, both said reels being mounted on said housing; and a self-threading device mounted on said housing and defining an elongated path along which the film is guided between said reels, said device comprising a film drive for advancing the film lengthwise and an elongated guide channel which is permanently mounted on said housing and through which the film is advanced between said drive and said takeup reel, said channel comprising a pair of elongated sections of substantially L-shaped cross-sectional outline, one of said sections being fixedly attached to said housing and the other section being movable with reference to said one section substantially transversely of that portion of the film which extends between said sections, said other section being movable between open and closed positions in which it respectively affords and prevents access to said portion of the film, said device further comprising additional guide means for the film mounted on said one section.

15. A structure as set forth in claim 14, wherein said additional guide means comprises at least one guide roller.

16. A structure as set forth in claim 14, wherein said additional guide means includes at least one guide rail.

17. In a projector, a film supply reel; a takeup reel; a support; and a film-threading device mounted on said support and defining an elongated path along which the film is guided between said reels, said device comprising a film drive for advancing the film lengthwise and a guide channel which is permanently mounted on said support and through which the film is advanced between said drive and said takeup reel, said channel comprising a plurality of sections one of which is movable with reference to the remainder of said channel substantially transversely of the film between an open and a closed position in which it respectively affords and prevents access to the film, said device further comprising a loop former movable between operative and inoperative positions and mounted on the remainder of said channel, motion transmitting means for moving said loop former to operative position, and blocking means for releasably holding said motion transmitting means in a position corresponding to operative position of said loop former, said blocking means being arranged to be disengaged from said motion transmitting means in response to tightening of the film when the latter is advanced through said channel by the takeup reel.

18. In a projector, a film supply reel; a takeup reel; a support; and a film-threading device mounted on said support and defining an elongated path along which the film is guided between said reels, said device comprising a film drive having a plurality of feed sprockets for advancing the film lengthwise and a guide channel which is permanently mounted on said support and through which the film is advanced between one of said sprockets and said takeup reel during threading and during the projection of images, said channel comprising a plurality of sections one of which is movable with reference to the remainder of said channel substantially transversely of the film between an open and a closed position in which it respectively affords and prevents access to the film, said remainder of the channel resembling an L-shaped body.

19. In a projector, a film supply reel; a takeup reel; a support; and a film threading device mounted on said support and defining an elongated path along which the film is guided between said reels, said device comprising a film drive for advancing the film lengthwise and a guide channel which is permanently mounted on said support and through which the film is advanced between said drive and said takeup reel, said channel comprising a plurality of sections at least one of which is movable with reference to the remainder of said channel substantially transversely of the film between an open and a closed position in which it respectively affords and prevents access to the film, each of said sections having a substantially L-shaped cross-sectional outline.

20. A structure as set forth in claim 1, wherein said sections of said guide channel have walls which enclose the film from all sides when said one section is moved to closed position.

21. A structure as defined in claim 20, wherein said one section forms the cover and said remainder forms the bottom part of said guide channel.

References Cited

UNITED STATES PATENTS

| | | | |
|---|---|---|---|
| 1,260,185 | 3/1918 | Gonsky | 242—55.11 X |
| 2,051,789 | 8/1936 | Foster et al. | 242—55.11 |
| 3,254,858 | 6/1966 | Camra et al. | 242—55.13 |

LEONARD D. CHRISTIAN, *Primary Examiner.*